United States Patent
Neumann

(10) Patent No.: US 8,009,377 B2
(45) Date of Patent: Aug. 30, 2011

(54) TAPE ARCHITECTURE AND A HEAD ARCHITECTURE FOR A LINEAR TAPE DRIVE HAVING A REDUCED ACTUATOR STROKE

(75) Inventor: Lawrence G. Neumann, Lancaster, MA (US)

(73) Assignee: Quantum Corporation, San Jose, CA (US)

( * ) Notice: Subject to any disclaimer, the term of this patent is extended or adjusted under 35 U.S.C. 154(b) by 216 days.

(21) Appl. No.: 12/395,479

(22) Filed: Feb. 27, 2009

(65) Prior Publication Data

US 2010/0220410 A1 Sep. 2, 2010

(51) Int. Cl.
*G11B 5/09* (2006.01)
*G11B 5/584* (2006.01)
*G11B 5/127* (2006.01)

(52) U.S. Cl. .................. 360/48; 360/77.12; 360/110

(58) Field of Classification Search .................. None
See application file for complete search history.

(56) References Cited

U.S. PATENT DOCUMENTS

| | | | | |
|---|---|---|---|---|
| 5,488,525 A | * | 1/1996 | Adams et al. | 360/77.12 |
| 2008/0170328 A1 | * | 7/2008 | Kawakami et al. | 360/122 |
| 2009/0213493 A1 | * | 8/2009 | Bui et al. | 360/110 |

* cited by examiner

*Primary Examiner* — Daniell L Negrón
*Assistant Examiner* — Regina N Holder
(74) *Attorney, Agent, or Firm* — Baker Botts L.L.P.

(57) ABSTRACT

A tape architecture and a head architecture for a linear tape drive having a reduced actuator stroke is disclosed. In one embodiment, the linear tape drive head assembly includes a top portion having a plurality of write elements and no read elements at a first side and a plurality of read elements and no write elements at a second side opposite of the first side, and a bottom portion laterally offset from the top portion having a plurality of read elements and no write elements at the aforementioned first side and a plurality of write elements and no read elements at the aforementioned second side. The tape is recorded with all the data tracks within each logical band oriented in the same direction.

17 Claims, 6 Drawing Sheets

FIG. 1 (Background)

TAPE ARCHITECTURE AND A HEAD ARCHITECTURE FOR A LINEAR TAPE DRIVE HAVING A REDUCED ACTUATOR STROKE

BACKGROUND

In a tape drive, such as a linear tape drive, information is stored to and read from magnetic tape media. In general, the tape media will include a number of data tracks spaced laterally across the tape. These data tracks on the tape are usually grouped into a number of logical bands. Within each logical band are a number of sub-bands. For example, as shown in background FIG. 1, tape architecture 100 includes 4 logical bands 101-104 with each logical band including 4 sub-bands (111-114). Further, each sub-band includes a number of tracks. For example, sub-band 111 is shown broken down into 4 tracks (121-124). Although 4 logical bands, 4 sub-bands and 4 tracks are shown, it is merely for purposes of clarity in the description and Figure. Other numbers of logical bands, sub-bands and/or tracks may also be utilized.

In the present tape architecture, as shown by the arrows on tracks 121-124 of sub-band 111, some of the tracks (e.g., 121 and 122) are accessible when the tape is traveling in the forward direction and some of the tracks (e.g., 123 and 124) are accessible when the tape is traveling in the reverse direction. In other words, the present tape architecture orients each of the tracks within a sub band in a "serpentine" fashion.

The head architecture typically includes multiple channels that write and read data in a logical band, with a single channel for each data sub band. In general, a channel on the head refers to a reader and a writer, separated longitudinally. For example, when the tape travels in a forward direction across the head, the reader and writer would be in a first orientation. That is, the writer would be the first portion to encounter the track and the reader would be positioned to approach the data track after the writer.

However, when the tape travels in reverse across the head, the reader and writer would need to be in a second orientation. That is, the writer would again have to be the first to encounter the track and the reader would again need to be positioned after the writer.

Because of the need to have readers and writers in two orientations, multiple channel head architecture typically includes multiple readers and/or writers for each sub band. Drives using thin-film head technology usually have at least two readers and at least two writers per sub band, with one writer and one reader used when the tape is moving in one direction and the other reader and the other writer are used when the tape is moving in the opposite direction. Some tape drives have two of one and one of the other, for example two readers and one writer or one reader and two writers, with the single element centered longitudinally between the other two and is used when the tape is moving in both directions.

In at least one previously used head architecture, the separated readers and writers were laterally interleaved (except for the outside most reader or writer). That is, each reader which would be used when the tape was moving in one direction was located between two of the writers that would be used when the tape was moving in the opposite direction. Likewise, each writer which would be used when the tape was moving in one direction was located between two of the readers that would be used when the tape was moving in the opposite direction. The elements at the lateral edges of the cluster would of course not be between other elements.

In order to access all of the tracks within each sub bands, for example sub bands 111-114 of FIG. 1, the head is mounted on an actuator that moves it laterally across the tape. For example, the head would be in one location to write data track 121, would move to another location to write track 123 after the direction of tape motion was reversed. The head would move to another location to write track 122. Alternately, the head could be fabricated with offset elements so that the head location to write tracks 121 and 123, for example, could be the same, but the head would move to a different location to write tracks 122 and 124.

The active read/write portions of the head are typically manufactured to be the same size as one logical band. For example, if the logical band has 7 sub-bands, then the head will include 7 multiple channels which will match up to the 7 sub-bands and which will fill the entire logical band. Since the readers and writers are on the same part of the head, that is, covering a single logical band, a head actuator must be able to move the head not only to access the different tracks within a sub-band but also so that the readers and writers can access every logical band on the tape. This is the case whether there and two read elements and two write elements per channel, or if there are two of one and one of the other as described above, or if the read elements and the write elements are interleaved. Thus, in the example shown in FIG. 1 which shows 4 logical bands, the head must necessarily be able to travel approximately three-quarters of the tape width to ensure access to every data track in every logical band. For purposes of clarity, head travel is hereinafter referred to as 'stroke'.

SUMMARY

This Summary is provided to introduce a selection of concepts in a simplified form that are further described below in the Description of Embodiments. This Summary is not intended to identify key features or essential features of the claimed subject matter, nor is it intended to be used as an aid in determining the scope of the claimed subject matter.

A tape architecture and a head architecture for a linear tape drive having a reduced actuator stroke is disclosed. In one embodiment, the linear tape drive head assembly includes a top portion having a plurality of write elements and no read elements at a first side and a plurality of read elements and no write elements at a second side opposite of the first side, and a bottom portion laterally offset from the top portion having a plurality of read elements and no write elements at the aforementioned first side and a plurality of write elements and no read elements at the aforementioned second side. The tape is recorded with all the data tracks within each logical band oriented in the same direction.

BRIEF DESCRIPTION OF THE DRAWINGS

The accompanying drawings, which are incorporated in and form a part of this specification, illustrate embodiments of the subject matter and, together with the description, serve to explain principles discussed below.

Background

Figure 1:
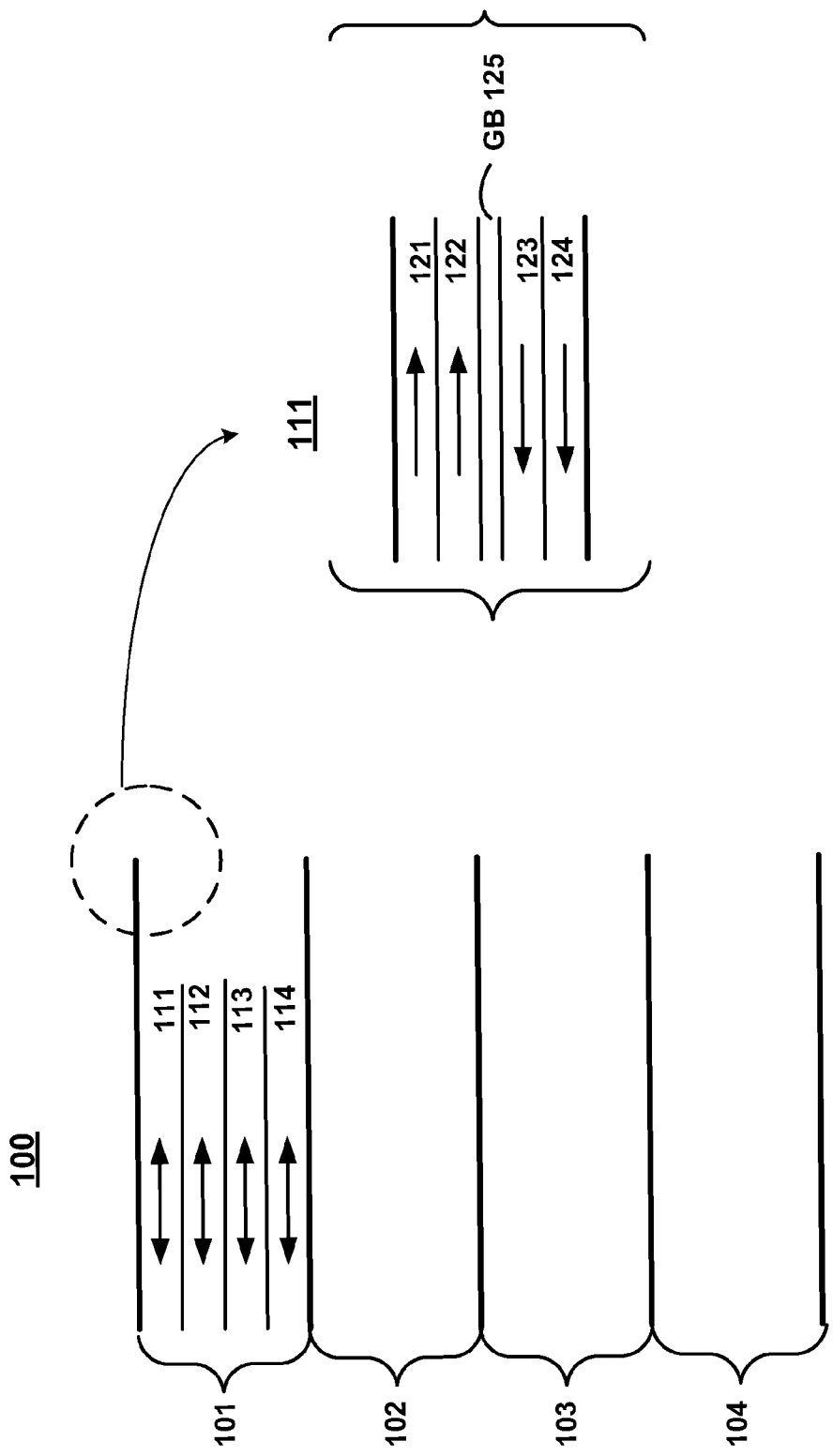
FIG. 1 is a block diagram of previous tape architecture.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Overview of Discussion

A novel tape track architecture and head layout is described herein. In one embodiment, the linear tape architecture includes a plurality of tracks that are laid in a forward direction and a similar number of tracks laid in the opposite or reverse direction. For example, in one embodiment, each track within a specific sub band is oriented in the same direction. Further, each sub band within a specific logic band is also oriented in the same direction. Thus, each track in a logical band of the tape track architecture is oriented in the same direction; either forward or reverse with respect to the tape's motion. For purposes of clarity, hereinafter, a logical band will be referred to as a 'forward logical band' to signify that each track within the logical band is oriented in a forward read/write direction and similarly a 'reverse logical band'. However, it should be understood that in different embodiments, the actual direction of any logical band may be reversed without adverse effect.

In one embodiment, within the total tape architecture there are approximately the same numbers of logical bands oriented in both directions. For example, in one embodiment a tape architecture consisting of 4 logical bands has 2 forward logical bands and 2 reverse logical bands. Similarly, in one embodiment a 12 logical band tape architecture may include 6 forward logic bands and 6 reverse logic bands. Although, it is also appreciated that numerous combinations of tape architectures may be generated and may not necessarily always include an equal number of both forward and reverse logical bands.

In one embodiment, the architecture of the head and tape are correlated such that a first part of the head is used for reading and writing at the upper half of the tape and a second part of the head is used for reading and writing at the lower half. In addition, in one embodiment the first part of the head has a first side that has only write heads and a second side that has only read heads. These two sides are used exclusively when the tape is moving in one, for example forward, direction. The head also has a second part which also has a first side that has only write heads and a second side that has only read heads but is used exclusively when the tape is moving in the opposite, for example reverse, direction. The first side of the head that is used when the tape is moving in the reverse direction is longitudinally aligned with the second side of the head that is used when the tape is moving in the forward direction and transversely offset from the first part of the head. In contrast, previous head architectures either use merged readers and writers that access essentially the same parts—within a few microns—of the tape or interleaved readers and writers, so that the same part of the head is used to write and read tracks for both forward and reverse tape motion.

By separating the readers and the writers and spreading them out on different parts of the head, and by dedicating separate bands to recording in forward and reverse directions, the actuator travel is reduced. For example, in one configuration, the actual actuator travel (or stroke) can be reduced to a distance that is less than half the total tape width. For example, in previous head architecture and tape layout (such as a tape having 12 logical bands oriented similar to the architecture shown in Background FIG. 1) the actuator stroke was approximately 10.538 mm. In contrast, utilizing the tape layout and head architecture described herein (such as similar to the architecture shown in FIGS. 3 and 4) the total travel of the head on a tape of similar width is reduced to approximately 4.82 mm.

Another benefit is that, for sequential recording within a single pair of bands (one forward and one reverse), the lateral motion of the actuator at tape turn-around can be significantly less than other architectures. For example, in one embodiment, at the end of the forward pass, the reverse writer and reader are already correctly positioned for recording and/or reading the reverse track. Moreover, at the end of the reverse pass, the head only needs only to be moved one track pitch to access the next forward track.

Further, when the tape layout includes each track in the top half of the tape oriented to be read and written in a first (or forward) direction and each track in the bottom half of the tape is oriented to be read and written in a second (or reverse) direction, at the completion of accessing the data in the last data tracks in a pair of logical bands the head only needs to be moved laterally the width of the spacing between logical bands to access the first data tracks in a new pair of bands.

The present discussion will continue with a description of an example tape drive with which, or upon which, embodiments described herein may operate. The discussion will proceed to a description of tape architecture. Components of a novel head design will then be described. Operation of the novel head design in conjunction with the tape architecture will then be discussed in more detail.

Example Tape Drive

Figure 2:
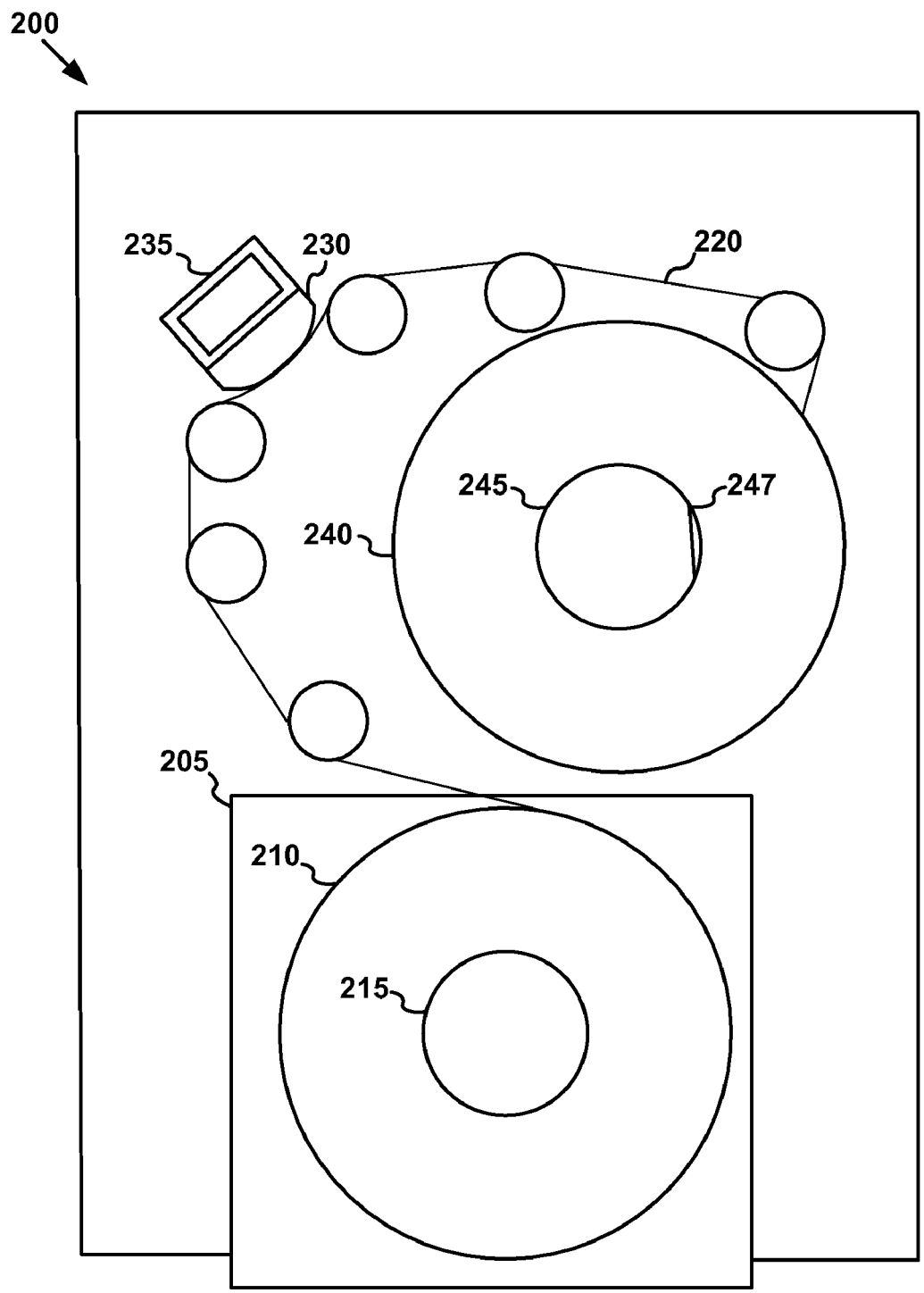
FIG. 2 shows a diagram of a linear tape drive in accordance with one embodiment of the subject matter described herein.

FIG. 2 is a diagram of an example linear tape drive 200 incorporating an embodiment of the subject matter described herein. Linear tape drive 200 represents a generic linear tape drive, and is shown by way of example and not of limitation. It is appreciated that the subject matter described herein is not limited to use with/within the specific linear tape drive 200 configuration shown, but instead is operable with/within a variety of linear tape drive architectures. Linear tape drive 200 is shown with a tape cartridge 205 inserted therein. In one embodiment, tape cartridge 205 is removable from linear tape drive 200, and includes a cartridge reel 210 with a cartridge reel hub 215. Tape 220 is spooled about cartridge reel hub 215 of cartridge reel 210. Tape cartridge 205 supplies tape 220 to tape drive 200. Linear tape drive 200 also includes a drive reel 240 which takes up tape 220 from tape cartridge 205 (when inserted).

A portion of tape 220 (such as a leader) is coupled to drive reel hub 245 by means of a fastening device 247, such as, for example, a grabber or buckler. Fastening device 247 engages tape 220 and then integrates or blends with drive reel hub 245, thereby coupling tape 220 to drive reel hub 245.

During operation of linear tape drive 200, tape 220 is spooled between drive reel 240 and cartridge reel 210 and in the process is guided longitudinally across a head 230. Head 230 operates to read data from and to write data to data tracks on tape 220 as tape 220 travels longitudinally in proximity to head 230 while being spooled between drive reel 240 and cartridge reel 210. Described in further detail herein, head 230 includes a plurality of read elements and write elements for reading and/or writing data from/to tracks on tape 220. In one embodiment, head 230 may also include at least one servo read element for reading servo information recorded on the magnetic tape.

In one embodiment, head 230 is supported by an actuator 235. In general, actuator 235 positions head 230 laterally with respect to the magnetic tape 220; that is, it moves head 230 between tracks on tape 220 as well as providing head 220 location adjustments to ensure the position of head 230 remains relatively constant with respect to the tracks recorded longitudinally along tape 220. In another embodiment, actuator 235 may be a compound servo actuator comprising a coarse actuator driven by, for example, a voice coil motor (VCM) and a fine actuator driven by, for example, a micro voice coil motor. In one embodiment, the fine actuator may be mechanically mounted on/coupled with the moving portion of the coarse actuator.

Tape Architecture

Figure 3:
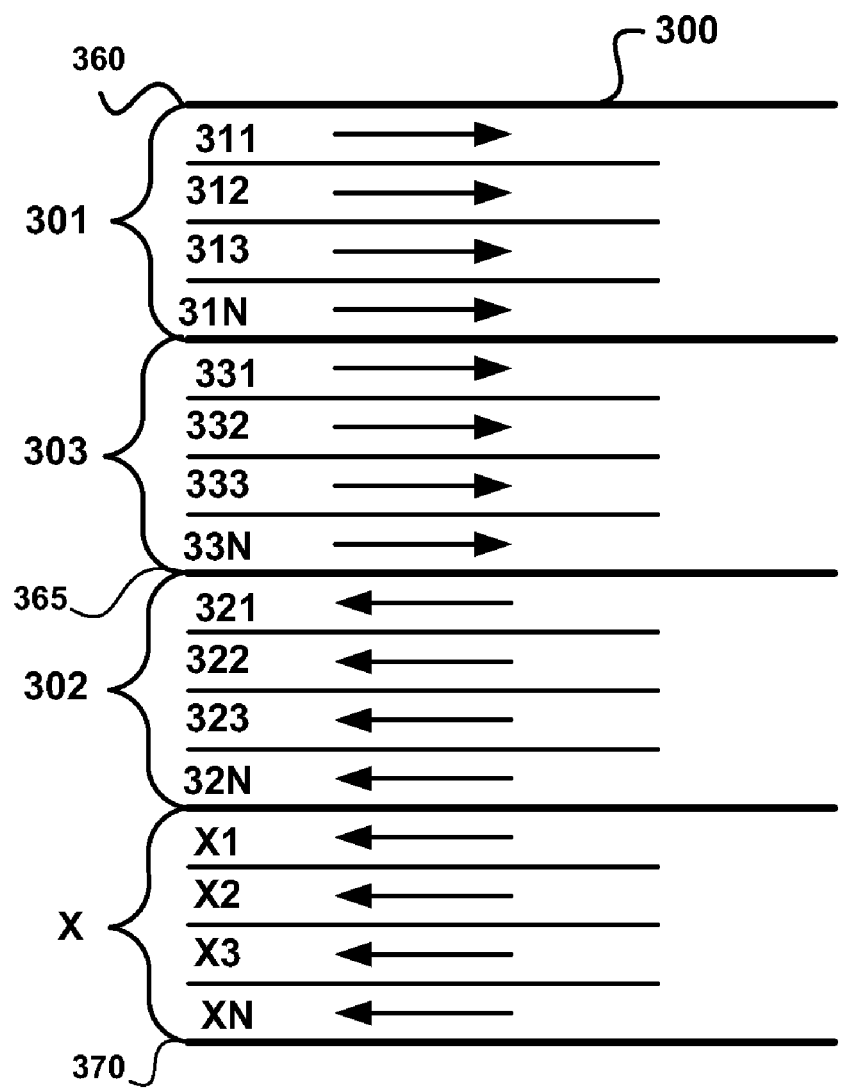
FIG. 3 shows a diagram of linear tape drive tape architecture in accordance with an embodiment of the subject matter described herein.

With reference now to FIG. 3, a diagram of linear tape drive tape architecture 300 is shown in accordance with an embodiment of the present technology. In the present discussion, tape architecture 300 is labeled with orientation markings including a top of the tape 360 designation, a middle of the tape 365 designation and a bottom of the tape 370 designation. However, it should be understood that designations such as top of tape, middle of tape and bottom of tape are not meant to be specific tape features, but instead are provided within the context of the present discussion for purposes of clarity.

In one embodiment, tape architecture 300 includes a plurality of logical bands 301-$x$. Tape architecture 300 also includes a plurality of sub bands within each logical band, each of which further includes a plurality of tracks oriented in the same first direction. For example, logical band 301 includes sub bands 311-31$n$, each of which further includes a plurality of tracks oriented in the same direction. In differing embodiments, first direction could be either forward or reverse in linear tape operation. For purpose of clarity alone, examples herein will refer to the first direction as a forward direction of tape 220.

In one embodiment, tape architecture 300 includes a second plurality of tracks forming a second sub band 321 and a plurality of second sub bands 321-32$n$ making up a second logical band 302. As previously stated, first direction (and therefore second direction) could be either forward or reverse in linear tape operation. However, for purpose of clarity some examples provided herein will refer to the second direction as a reverse direction of tape 220.

In one embodiment, tape architecture 300 is shown with x logical bands each having n sub bands therein to illustrate that tape architecture 300 is well suited to any number of logical bands, sub bands per logic band and/or tracks per sub band.

Moreover, although tape architecture 300 is shown with a seemingly similar number of logical bands and sub bands per logical band, an embodiment may have some or all of logical bands, sub bands per logic band and tracks per sub band being different in number. For example, one embodiment may include a track architecture having 12 logical bands, 7 sub bands per logic band and 8 tracks per sub band.

In one embodiment, a top half of tape architecture 300 includes x/2 forward logical bands; that is, logical band consisting of tracks oriented to be read when the tape is operating in a forward direction. Conversely, the bottom half of tape architecture 300 includes x/2 reverse logical bands; that is, each logical band consisting of tracks oriented to be read when the tape is operating in a reverse direction. For example, in one embodiment, every track within any logical bands located between top of tape 360 and middle of tape 365 are oriented in a first direction, while every track within any logical bands located between middle of tape 365 and bottom of tape 370 are oriented in the opposite direction. Thus, in a 6 logical band architecture for example, the resultant architecture would include 3 forward logical bands and 3 reverse logical bands.

Figure 5:
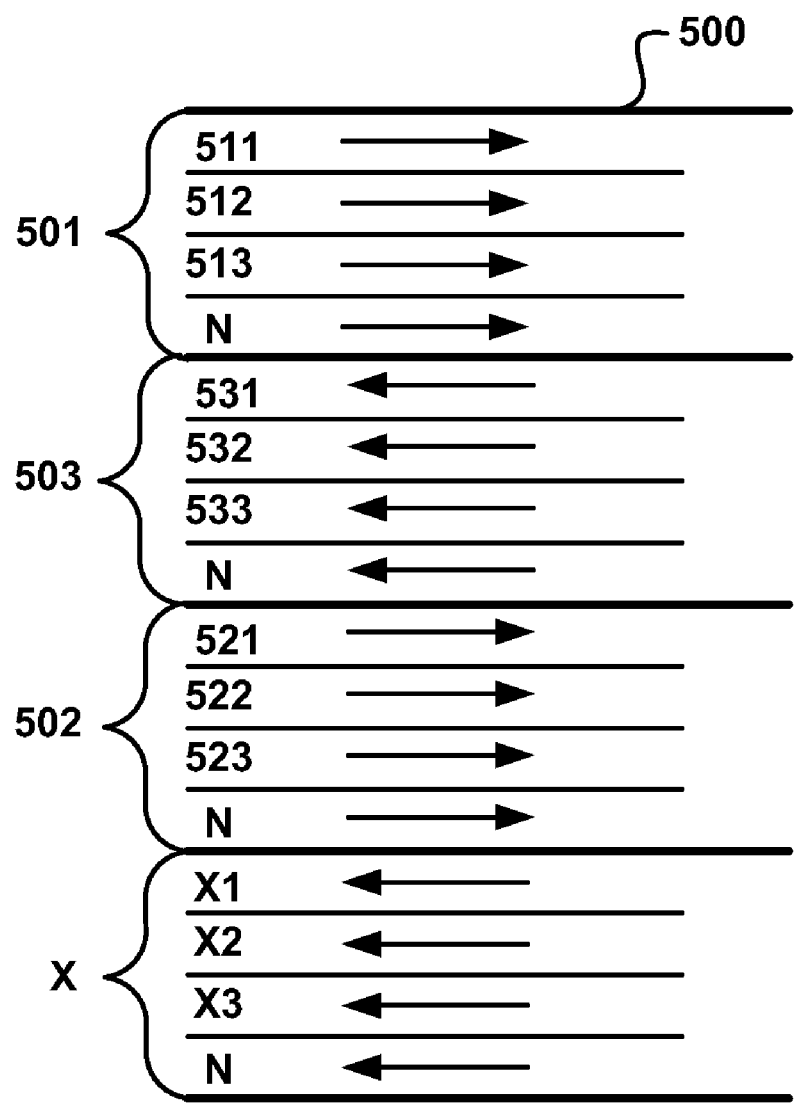
FIG. 5 shows a diagram of linear tape drive tape architecture in accordance with another embodiment of the subject matter described herein.

In another embodiment, as shown in tape architecture 500 of FIG. 5, the x logical bands are oriented in an alternating topography. In other words, every track in the first logical band 501 is oriented in a first direction while every track in the next logical band 503 is oriented in the reverse direction. The pattern being repeated for all x logical bands on the tape.

In yet another embodiment, tape architecture 300 may consist of x logical bands oriented in a double alternating topography. In other words, every track in the top two logical bands (e.g., 301 and 303) is oriented in a first direction while every track in the next two logical bands (e.g., 302 and x) is oriented in the reverse direction. The pattern being repeated for all x logical bands on the tape.

Advantageously, tape architecture embodiments described herein provide significant tape real estate savings when compared with previous tape architectures. For example, in FIG. 1 tracks 121 and 122 of sub band 111 are oriented in a forward operating direction while tracks 123 and 124 of sub band 111 are oriented for when the tape is moving in a reverse direction. Thus, a guard band 125 is needed between tracks 122 and 123. In other words, any neighboring tracks of opposite direction within sub band 111 require a guard band 125 to protect the integrity of the tracks. Thus, in a tape architecture as shown in FIG. 1 having, for example, 12 logical bands with 7 sub bands per logical band, each sub band would need at least one guard band for a total of at least 84 guard bands.

In contrast, as shown in FIG. 3, in one embodiment, tape architecture 300 does not require a guard band between any tracks within or between any sub bands since every track within each sub band is oriented in the same direction. Thus, in one embodiment, tape architecture 300 would only need a maximum of 12 guard bands. Moreover, that number is only reached if each logical band were oriented in a direction opposite that of the next logical band directly above or below, such as shown in FIG. 5. However, in another embodiment, such as the tape architecture of FIG. 3, where each track within each logical band at the top half of the tape is oriented in a first direction and each track within each logical band at the bottom half of the tape is oriented in the opposite direction, only one guard band would be necessary.

Thus, the tape architecture of FIGS. 3 and 5 will provide a reduction of more than 70+ guard bands with respect to the previous tape architecture. In one embodiment, the tape real-estate savings may be translated into an increase in the number of usable tracks, an increase in overall track width, a reduction in actual tape width, a combination thereof, or the like.

Head Design

Figure 4:
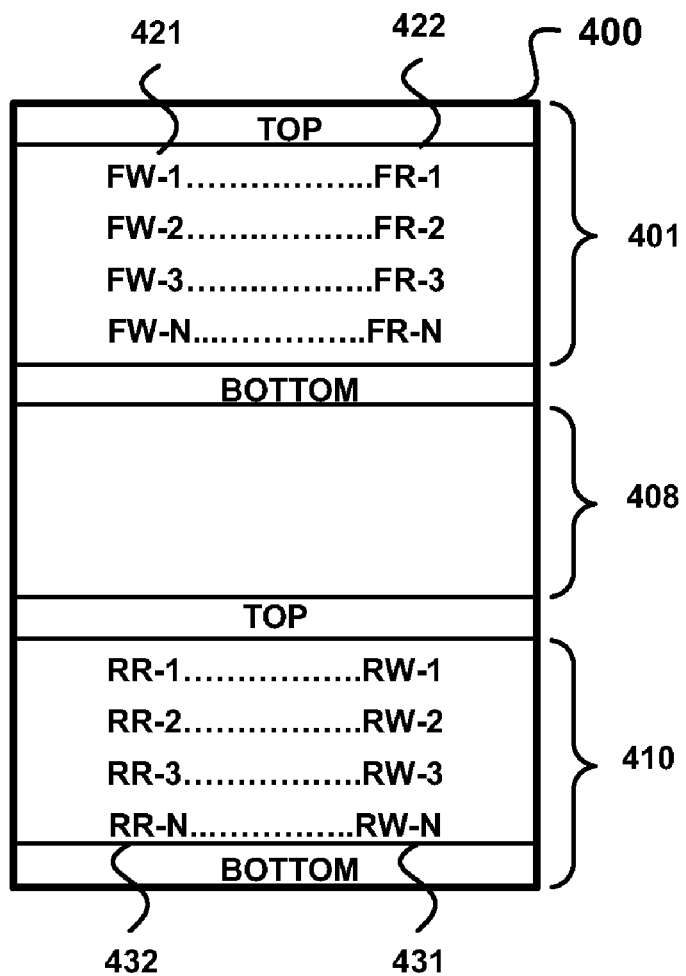
FIG. 4 shows a block diagram of a linear tape drive head assembly in accordance with one embodiment of the subject matter described herein.
Figure 6:
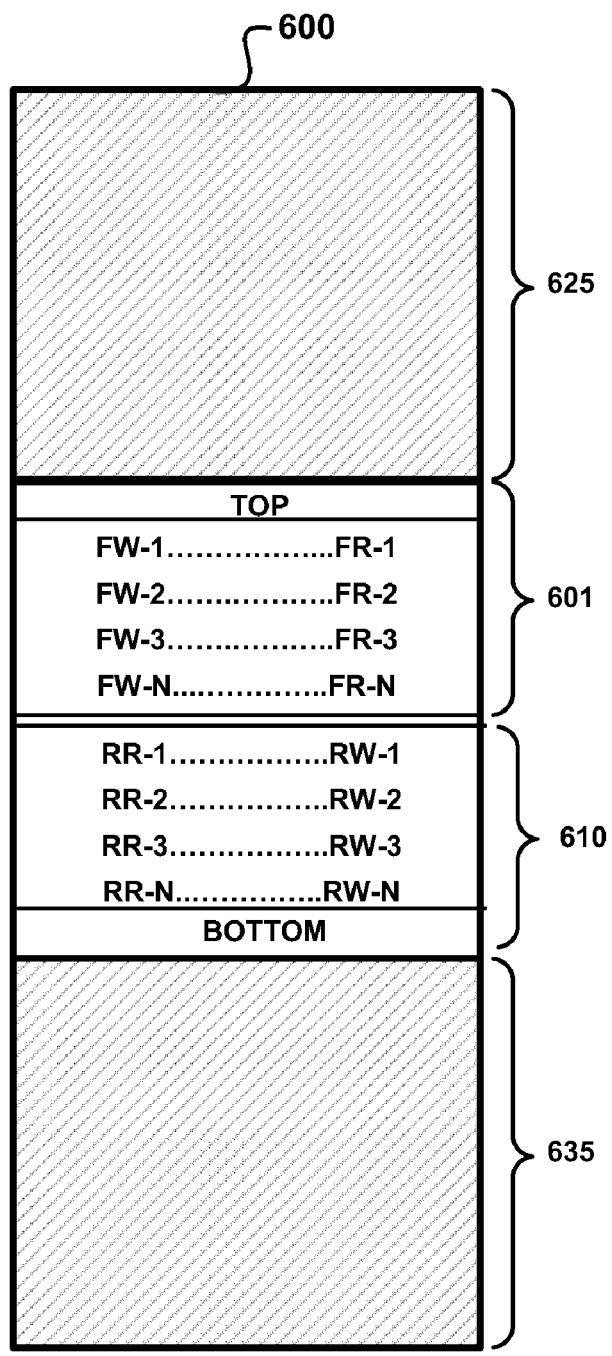
FIG. 6 shows a block diagram of a linear tape drive head assembly in accordance with another embodiment of the subject matter described herein.

With reference now to FIG. 4, a block diagram of a linear tape drive head is shown in accordance with one embodiment of the present technology. In one embodiment, head architecture 400 is designed with respect to tape architecture 300. Similarly, block diagram 600 of FIG. 6 shows another embodiment of a linear tape drive head 600 designed with respect to tape architecture 500. Due to the sheer number of possible head and tape architectures, all possible architectures cannot reasonably receive their own diagrams. However, the two embodiments shown herein clearly illustrate the basic building blocks such that additional architectures of both the head and the tape track layout can be extrapolated. In one embodiment, head architecture 600 is similar to that of architecture 400 except for the logical band spacing distinctions described herein. For example, top portion 601 and bottom portion 610 of FIG. 6 are similar to top portion 401 and bottom portion 410 of FIG. 4 respectively.

In one embodiment, head assembly 400 includes a top portion 401 having a plurality of write elements 421 and no read elements at a first side and a plurality of read elements 422 and no write elements at a second side opposite of the first side. In one embodiment, top portion 401 is approximately the size of one logical band such as logical band 301 of tape architecture 300. Additionally, in one embodiment, head architecture 400 includes in top portion 401 approximately n write elements and n read elements, where n is the number of sub-bands within a logical band such as logical band 301 of associated tape architecture 300.

Referring still to FIG. 4, one embodiment of head architecture 400 also includes a bottom portion 410 having a plurality of write elements 431 and no read elements at the second side and a plurality of read elements 432 and no write elements at the first side opposite of the second side. In one embodiment, the bottom portion 410 is approximately the size of one logical band such as logical band 302 of tape architecture 300 and similarly includes approximately n write elements and n read elements, where n is the number of sub-bands within a logical band such as logical band 302 of associated tape architecture 300.

With reference now to FIG. 6, in one embodiment if the tape architecture includes alternating direction logical bands similar to tape architecture 500, then middle portion 408 may be reduced or even removed. In another embodiment, if the tape architecture includes pairs of similarly oriented logical bands alternating with pairs of reverse oriented logical bands, then middle portion 408 may again be approximately one logical band in width.

In another embodiment, the logical band-pairs may be alternate direction after every second logical band, after every third logical band (e.g., three forward then three reverse), etc.) up to half of the total number of logical bands on the tape. In general, the inter-operation between head architecture and tape track layout with respect to FIG. 4 and FIG. 6 is similar except for the removal of a middle portion with respect to FIG. 6 and extensions 625 and 635 described in further detail herein.

In one embodiment, middle portion 408 of head architecture 400 has no associated read or write elements. In one embodiment, middle portion 408 is a significantly modifiable section of the head architecture which may be adjusted during manufacture depending on the layout of the associated track architecture, or vice-versa. For example, if the tape architecture 300 of FIG. 3 is utilized, that is 4 logical bands oriented such that a top half of the tape includes forward logical bands and the bottom half of the tape includes reverse logical bands, the middle portion 408 may be approximately equal to a single logical band width. Alternately, the width of the middle portion 408 may be chosen for other reasons and may not correspond directly to the tape architecture. For example, there may be constraints in head manufacture that determine an optimal width for middle portion 408. Such constraints will not eliminate the advantages of this architecture.

In another embodiment, when the tape architecture is the same except that 12 logical bands are available instead of 4 (e.g., the top half of the tape includes 6 forward logical bands) the middle portion 408 may be approximately equal to 5 logical band widths. Thus, in one embodiment, if the track architecture is similarly laid out (e.g., the top half in a first direction, the bottom half in the opposite direction) then the width of middle portion 408 may be approximately x/2−1 logical band widths where x is the total number of logical bands on the associated tape architecture.

In one embodiment, by separating the readers and the writers and spreading them out on different parts of the head as shown in FIGS. 4 and 6; as well as dedicating separate logical bands for recording in forward and reverse directions, significant reductions in the stroke of actuator 235 with respect to previous head architectures is achieved. For example, in one embodiment, a 12 logical band tape architecture similar to tape architecture 300 and head architecture 400 results in the total stroke of actuator 235 being less than half the total tape width or approximately 4.820 mm as opposed to the approximately 10.538 mm required by the architecture of FIG. 1.

In one embodiment, while not taking full advantage of the architecture as shown in FIG. 4, tape architecture 500 in conjunction with head architecture 600 reduces actuator travel significantly with respect to previous architectures. For example, head architecture 600 has forward readers and forward writers at a top portion 601 and reverse readers and reverse writers at a bottom portion 610. Thus, head architecture 600 and four-band tape architecture 500 (x=4) in combination reduce the total stroke of actuator 235 to less than 68% of the travel required by the architecture of FIG. 1.

Another benefit of tape architecture 300 used in conjunction with head architecture 400 is that, for sequential recording within a single pair of logical bands (one forward and one reverse), the lateral motion of the actuator 235 at tape turnaround is minimized. In other words, when utilizing head architecture 400, at the end of the forward pass, the reverse writer and reader are already correctly positioned for recording and/or reading the reverse track. Then, at the end of the reverse pass, head architecture 400 only needs to be moved one lateral track pitch to record the next forward track. In one embodiment, at the completion of a pair of logical bands, such as logical bands 301 and 302, actuator 235 need only move head 400 from the last tracks 31N in logical band 301 and 32N in logical band 302 to access the first tracks 331 in logical band 303 and X1 in logical band X.

Another benefit of tape architecture 500 used in conjunction with head architecture 600 is that, for sequential recording within a single pair of logical bands (one forward and one reverse), the lateral motion of the actuator 235 at tape turnaround is minimized. In other words, when utilizing head architecture 600, at the end of the forward pass, the reverse writer and reader are already correctly positioned for recording and/or reading the reverse track. Then, at the end of the reverse pass, head architecture 600 only needs to be moved one lateral track pitch to record the next forward track. In one embodiment, at the completion of a pair of logical bands, such as logical bands 501 and 503, actuator 235 will need to move head 600 two logical band widths across tape 500 to access the next pair of logical bands 502 and X.

With reference still to FIG. 6, extensions coupled with a head architecture are shown. In one embodiment, top extension 625 is connectively coupled with the top portion 601 of head architecture 600 while bottom extension 635 is connectively coupled with the bottom portion 610 of head architecture 600. In general, top extension 625 and bottom extension 635 must be of sufficient length to provide support across the entire width of a tape regardless of the location of head architecture 600. For example, in one embodiment, the length of each of the top extension 625 and the bottom extension 635 are approximately equal to the width of the associated tape minus the size of the head architecture.

In other words, since the tape is always supported by the head, when the top portion 601 of head architecture 600 is located at the topmost logical band of the tape, bottom extension 635 must extend at least to, and in one embodiment slightly beyond, the bottom of the bottommost logical band on the tape. Similarly, when the bottom portion 610 of head architecture 600 is located at the bottommost logical band of the tape, top extension 635 must extend at least to, and in one embodiment slightly beyond, the top of the topmost logical band on the tape. Similarly, the extensions can be utilized in head architecture 400 of FIG. 4.

For example, in tape architecture 300 or similar architectures having x logical bands, the length of head architecture 400 is approximately $(x/2+1)/x$ times the width of tape 300 and each of top extension 625 and bottom extension 635 is approximately $(x/2-1)/x$ times the width of tape 300. Thus, in one embodiment, the total length of the combined head and extensions is approximately $(x+(x/2)-1)/x$ times the width of tape 300, where x is the total number of logical bands on the tape. For example, if the tape has 12 logical bands, head architecture 400 would be approximately $7/12$ of the total tape width and each extension would be approximately $5/12$ of the total tape width. Thus, the resulting structure 600 is $17/12$ times the width of the tape.

In contrast, the size of previous architecture of FIG. 1 for a tape having 12 logical bands would include a head architecture of $1/12$ of the tape width plus two extensions each $11/12$ in length. Thus, the resulting head structure would be approximately $23/12$ times the width of the tape.

In other words, head architecture 400 will be smaller than previous head architectures and will therefore have a lower mass. In one embodiment, the lower head mass directly correlates to better tracking. For example, actuator 235 does not have to move as much mass to keep the read and write elements of head architecture 600 centered with respect to tape wobble or other tracking concerns. Moreover, because the total stroke of actuator 235 is also reduced, the movement is also easier for actuator 235 than for the architecture of FIG. 1 due to the reduced stroke in conjunction with the reduced mass of the head architecture described herein.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A linear tape drive head assembly comprising:
a top portion having a plurality of write elements and no read elements at a first side and a plurality of read elements and no write elements at a second side opposite of said first side;
a bottom portion having a plurality of write elements and no read elements at said second side and a plurality of read elements and no write elements at said first side opposite of said second side; and
a middle portion having no read or write elements thereon, wherein said middle portion is approximately an integral multiple between 1 and $(x/2-1)$ times the width of a logical band of an associated tape.

2. The head assembly of claim 1, wherein each of said plurality of write elements and similarly said plurality of read elements are approximately n, where n is a number of sub-bands within a logical band of an associated tape.

3. The head assembly of claim 1, wherein said top portion and said bottom portion are each approximately the size of one logical band of an associated tape.

4. The head assembly of claim 1, further comprising:
a top extension connectively coupled with said top portion of said head assembly; and
a bottom extension connectively coupled with said bottom portion of said head assembly, said top extension and said bottom extension for supporting said the entire width of the tape media regardless of a location of said top portion or said bottom portion of said head assembly.

5. The head assembly of claim 4 wherein the length of each of said top extension and said bottom extension are approximately equal to the width of said associated tape minus the size of said head assembly.

6. A linear tape drive tape architecture comprising:
a first plurality of logical bands, each containing a multiplicity of sub bands, each of which includes a plurality of tracks, each oriented in a first direction;
a second plurality of logical bands next to the first plurality of logical bands, each containing a multiplicity of sub bands, each of which includes a plurality of tracks, each oriented in a second direction opposite of said first direction;
a third plurality of logical bands next to the second plurality of logical bands, each containing a multiplicity of sub bands, each of which includes a plurality of tracks, each oriented in said first direction; and
a fourth plurality of logical bands next to the third plurality of logical bands, each containing a multiplicity of sub bands, each of which includes a plurality of tracks, each oriented in said second direction,
wherein said tape architecture comprises x logical bands, a top half of said x logical bands each comprising data tracks oriented in a first direction and a bottom half of said x logical bands each comprising data tracks oriented in a second, opposite direction.

7. A linear tape drive tape architecture comprising:
a first plurality of logical bands, each containing a multiplicity of sub bands, each of which includes a plurality of tracks, each oriented in a first direction;
a second plurality of logical bands next to the first plurality of logical bands, each containing a multiplicity of sub bands, each of which includes a plurality of tracks, each oriented in a second direction opposite of said first direction;
a third plurality of logical bands next to the second plurality of logical bands, each containing a multiplicity of sub bands, each of which includes a plurality of tracks, each oriented in said first direction; and a fourth plurality of logical bands next to the third plurality of logical bands, each containing a multiplicity of sub bands, each of which includes a plurality of tracks, each oriented in said second direction, wherein said tape architecture comprises x logical bands oriented in an alternating topography such that a first of said x logical bands is oriented in a first direction and a next of said x logical bands is said oriented in a second, opposite direction, said pattern repeating for all of said x logical bands on said tape.

8. A linear tape drive tape architecture comprising:

a first plurality of logical bands, each containing a multiplicity of sub bands, each of which includes a plurality of tracks, each oriented in a first direction;

a second plurality of logical bands next to the first plurality of logical bands, each containing a multiplicity of sub bands, each of which includes a plurality of tracks, each oriented in a second direction opposite of said first direction;

a third plurality of logical bands next to the second plurality of logical bands, each containing a multiplicity of sub bands, each of which includes a plurality of tracks, each oriented in said first direction; and a fourth plurality of logical bands next to the third plurality of logical bands, each containing a multiplicity of sub bands, each of which includes a plurality of tracks, each oriented in said second direction, wherein said tape architecture comprises x logical bands in a double alternating topography such that a top two of said x logical bands are each oriented in a first direction and a next two of said x logical bands are oriented in a second, opposite direction, said pattern repeating for all of said x logical bands on said tape.

9. A linear tape drive tape architecture comprising:

a first plurality of logical bands, each containing a multiplicity of sub bands, each of which includes a plurality of tracks, each oriented in a first direction;

a second plurality of logical bands next to the first plurality of logical bands, each containing a multiplicity of sub bands, each of which includes a plurality of tracks, each oriented in a second direction opposite of said first direction;

a third plurality of logical bands next to the second plurality of logical bands, each containing a multiplicity of sub bands, each of which includes a plurality of tracks, each oriented in said first direction; and a fourth plurality of logical bands next to the third plurality of logical bands, each containing a multiplicity of sub bands, each of which includes a plurality of tracks, each oriented in said second direction, wherein said tape architecture comprises x logical bands in a multiple alternating topography such that a top N of said x logical bands are each oriented in a first direction and a next N of said x logical bands are oriented in a second, opposite direction, where N is a factor of x, said pattern repeating for all of said x logical bands on said tape.

10. A linear tape drive tape architecture comprising:

a first plurality of logical bands, each containing a multiplicity of sub bands, each of which includes a plurality of tracks, each oriented in a first direction;

a second plurality of logical bands next to the first plurality of logical bands, each containing a multiplicity of sub bands, each of which includes a plurality of tracks, each oriented in a second direction opposite of said first direction;

a third plurality of logical bands next to the second plurality of logical bands, each containing a multiplicity of sub bands, each of which includes a plurality of tracks, each oriented in said first direction; and a fourth plurality of logical bands next to the third plurality of logical bands, each containing a multiplicity of sub bands, each of which includes a plurality of tracks, each oriented in said second direction, wherein said tape architecture comprises x logical bands in a multiple alternating topography such that a top N of said x logical bands are each oriented in a first direction and a next N of said x logical bands are oriented in a second, opposite direction, where N is approximately equal to x/2, said pattern repeating for all of said x logical bands on said tape.

11. A linear tape drive having a reduced actuator stroke, said linear tape drive comprising:

a head having a first side and a second side opposite to each other, the head comprising:

a top portion having a plurality of write elements and no read elements at said first side of the head and a plurality of read elements and no write elements at said second side of the head;

a middle portion having no read or write elements thereon; and a bottom portion having a plurality of write elements and no read elements at said second side of the head and a plurality of read elements and no write elements at said first side of the head;

a drive reel configured for engaging a tape and, during operation, rotatably spooling said tape such that said tape passes longitudinally in proximity to said head;

an actuator for laterally positioning said head with respect to a target position on said tape in said tape drive; and a tape architecture comprising:

a plurality of first logical bands comprising a plurality of first sub bands comprising a plurality of tracks oriented in a first direction; and a plurality of second logical bands comprising a plurality of second sub bands comprising a plurality of tracks oriented in a second direction; and said head oriented with respect to said tape architecture such that said top portion of said head is utilized for reading and writing to any of said plurality of said first logical bands and said bottom portion of said head is utilized for reading and writing to any of said plurality of said second logical bands, wherein said tape comprises x logical bands, with half of said x logical bands each comprising tracks oriented in a first direction and a second half of said x logical bands each comprising tracks oriented in a second direction, with N logical bands at the top of the tape oriented in the first direction, the next N logical bands oriented in the second direction, such groups of N logical bands alternating across the entire width of the tape, with N a factor of x.

12. The linear tape drive of claim 11, wherein each of said plurality of write elements and similarly said plurality of read elements at both said top portion and said bottom portion are approximately n, where n is a number of either said first sub bands within said first logical band or said second sub-bands within said second logical band.

13. A linear tape drive having a reduced actuator stroke, said linear tape drive comprising:
- a head having a first side and a second side opposite to each other, the head comprising:
  - a top portion having a plurality of write elements and no read elements at said first side of the head and a plurality of read elements and no write elements at said second side of the head;
  - a middle portion having no read or write elements thereon; and
  - a bottom portion having a plurality of write elements and no read elements at said second side of the head and a plurality of read elements and no write elements at said first side of the head;
- a drive reel configured for engaging a tape and, during operation, rotatably spooling said tape such that said tape passes longitudinally in proximity to said head;
- an actuator for laterally positioning said head with respect to a target position on said tape in said tape drive; and
- a tape architecture comprising:
  - a plurality of first logical bands comprising a plurality of first sub bands comprising a plurality of tracks oriented in a first direction; and
  - a plurality of second logical bands comprising a plurality of second sub bands comprising a plurality of tracks oriented in a second direction; and
- said head oriented with respect to said tape architecture such that said top portion of said head is utilized for reading and writing to any of said plurality of said first logical bands and said bottom portion of said head is utilized for reading and writing to any of said plurality of said second logical bands,
- wherein said tape comprises x logical bands, with half of said x logical bands each comprising tracks oriented in a first direction and a second half of said x logical bands each comprising tracks oriented in a second direction, with N logical bands at the top of the tape oriented in the first direction, the next N logical bands oriented in the second direction, such groups of N logical bands alternating across the entire width of the tape, with N approximately equal to x/2.

14. A linear tape drive having a reduced actuator stroke, said linear tape drive comprising:
- a head comprising:
  - a top portion having a plurality of write elements and no read elements at a first side and a plurality of read elements and no write elements at a second side opposite of said first side;
  - a middle portion having no read or write elements thereon; and
  - a bottom portion having a plurality of write elements and no read elements at said second side and a plurality of read elements and no write elements at said first side opposite of said second side;
- a drive reel configured for engaging a tape and, during operation, rotatably spooling said tape such that said tape passes longitudinally in proximity to said head;
- an actuator for laterally positioning said head with respect to a target position on said tape in said tape drive; and
- a tape architecture comprising:
  - a plurality of first logical bands comprising a plurality of first sub bands comprising a plurality of tracks oriented in a first direction; and
  - a plurality of second logical bands comprising a plurality of second sub bands comprising a plurality of tracks oriented in a second direction; and
- said head oriented with respect to said tape architecture such that said top portion of said head is utilized for reading and writing to any of said plurality of said first logical bands and said bottom portion of said head is utilized for reading and writing to any of said plurality of said second logical bands,
- wherein said tape comprises x logical bands, with half of said x logical bands each comprising tracks oriented in a first direction and a second half of said x logical bands each comprising tracks oriented in a second direction, with N logical bands at the top of the tape oriented in the first direction, the next N logical bands oriented in the second direction, such groups of N logical bands alternating across the entire width of the tape, with N a factor of x; and
- wherein said head size is approximately $(N+1)/x$ times the width of said tape, where x is said total number of logical bands on said tape.

15. The linear tape drive of claim 14 further comprising: a top extension connectively coupled with said top portion of said head; and a bottom extension connectively coupled with said bottom portion of said head, wherein a length of each of said top extension and said bottom extension is approximately $(x-(N+1))/x$ times the width of said tape, where x is said total number of logical bands on said tape.

16. The linear tape drive of claim 15 wherein a total length of said head and said top extension and said bottom extension is approximately $(2*x-(N+1))/x$ times the width of said tape, where x is said total number of logical bands on said tape.

17. A linear tape drive having a reduced actuator stroke, said linear tape drive comprising:
- a head comprising:
  - a top portion having a plurality of write elements and no read elements at a first side and a plurality of read elements and no write elements at a second side opposite of said first side;
  - a middle portion having no read or write elements thereon; and
  - a bottom portion having a plurality of write elements and no read elements at said second side and a plurality of read elements and no write elements at said first side opposite of said second side;
- a drive reel configured for engaging a tape and, during operation, rotatably spooling said tape such that said tape passes longitudinally in proximity to said head;
- an actuator for laterally positioning said head with respect to a target position on said tape in said tape drive; and
- a tape architecture comprising:
  - a plurality of first logical bands comprising a plurality of first sub bands comprising a plurality of tracks oriented in a first direction; and
  - a plurality of second logical bands comprising a plurality of second sub bands comprising a plurality of tracks oriented in a second direction; and
- said head oriented with respect to said tape architecture such that said top portion of said head is utilized for reading and writing to any of said plurality of said first logical bands and said bottom portion of said head is utilized for reading and writing to any of said plurality of said second logical bands,
- wherein said tape comprises x logical bands, with half of said x logical bands each comprising tracks oriented in a first direction and a second half of said x logical bands each comprising tracks oriented in a second direction, with N logical bands at the top of the tape oriented in the first direction, the next N logical bands oriented in the second direction, such groups of N logical bands alternating across the entire width of the tape, with N a factor of x; and wherein said stroke of said head actuator is approximately $(x-(N+1))/x$ times the width of said tape, where x is said total number of logical bands on said tape.

* * * * *